US012214905B2

(12) United States Patent
Lozano Segura

(10) Patent No.: US 12,214,905 B2
(45) Date of Patent: Feb. 4, 2025

(54) PASSENGER SEAT WITH REMOVABLE MODULAR COMPONENT

(71) Applicant: Safran Seats USA LLC, Gainesville, TX (US)

(72) Inventor: Rafael Lozano Segura, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 45 days.

(21) Appl. No.: 18/014,832

(22) PCT Filed: Jul. 9, 2020

(86) PCT No.: PCT/US2020/041346
§ 371 (c)(1),
(2) Date: Jan. 6, 2023

(87) PCT Pub. No.: WO2022/010481
PCT Pub. Date: Jan. 13, 2022

(65) Prior Publication Data
US 2023/0294842 A1 Sep. 21, 2023

(51) Int. Cl.
*B64F 5/10* (2017.01)
*B64D 11/06* (2006.01)
(52) U.S. Cl.
CPC ............ *B64F 5/10* (2017.01); *B64D 11/0624* (2014.12)
(58) Field of Classification Search
CPC .. B64D 11/0624; B64D 11/00153; B64F 5/10
(Continued)

(56) References Cited

U.S. PATENT DOCUMENTS 3,046,513 A   7/1962   Crowley
5,179,447 A   1/1993   Lain
(Continued)

FOREIGN PATENT DOCUMENTS

CN   207800045 U   8/2018
EP   0771692 A2   5/1997

OTHER PUBLICATIONS

International Patent Application No. PCT/US2020/041346, International Search Report and Written Opinion, mailed Mar. 22, 2021.
(Continued)

*Primary Examiner* — Milton Nelson, Jr.
(74) *Attorney, Agent, or Firm* — Kilpatrick Townsend & Stockton LLP

(57) ABSTRACT

Described is a passenger seat having a center console. The center console has a stationary portion including: a stationary portion structural member positioned at a connecting end of the stationary portion; and a disconnect panel. The center console has a separable modular portion having: a separable modular portion structural member positioned at a connecting end of the separable modular portion and coupleable to the stationary portion structural member; and an electrical wiring consolidation device that includes: an electrical cable bundle; and an electrical connector coupleable to the disconnect panel. The stationary portion structural member, the disconnect panel, the separable modular portion structural member, and the electrical wiring consolidation device form a quick connect structure for coupling the separable modular portion with the stationary portion.

20 Claims, 10 Drawing Sheets

(58) Field of Classification Search
USPC .......................................... 297/217.3, 217.4
See application file for complete search history.

(56) References Cited

U.S. PATENT DOCUMENTS

| | | | | |
|---|---|---|---|---|
| 5,611,513 A | * | 3/1997 | Rosen | ................... H01R 35/00 |
| | | | | 439/534 |
| 2003/0098589 A1 | | 5/2003 | Wikman et al. | |
| 2011/0272980 A1 | * | 11/2011 | Galecka | ................ B60N 2/809 |
| | | | | 439/502 |

OTHER PUBLICATIONS

European Application No. 20750048.9, Office Action mailed on Jul. 4, 2024, 4 pages.
China Appl. No. 202080104087.0, Office Action, Dec. 19, 2024, 14 pages.

* cited by examiner

PASSENGER SEAT WITH REMOVABLE MODULAR COMPONENT

FIELD OF THE INVENTION

The field of the invention relates to a passenger seat that has a seat element with a removable seat component.

BACKGROUND

Conventionally, the process of assembling an aircraft includes installing the passenger seats and other interior components by moving these components through a primary aircraft door into the interior of the aircraft. Because of this installation process, the outer dimensions of the passenger seats, especially business and first class seats, and other interior components are often dimensionally limited by the size of the primary aircraft door and are thus designed for specific aircraft models. For example, a seat model developed and used for a long-range aircraft may not fit through the primary aircraft door of a smaller, short-range aircraft. Instead, two separate seat models must be developed and assembled for use in the two different aircrafts.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises a center console, the center console comprising: a stationary portion comprising: a stationary portion structural member positioned at a connecting end of the stationary portion; and a disconnect panel; and a separable modular portion comprising: a separable modular portion structural member positioned at a connecting end of the separable modular portion and coupleable to the stationary portion structural member; and an electrical wiring consolidation device comprising: an electrical cable bundle; and an electrical connector coupleable to the disconnect panel, wherein the stationary portion structural member, the disconnect panel, the separable modular portion structural member, and the electrical wiring consolidation device form a quick connect structure for coupling the separable modular portion with the stationary portion.

In some embodiments, the separable modular portion is interchangeable with at least one second separable modular portion.

In certain embodiments, the at least one second separable modular portion comprises at least one different feature than the separable modular portion.

The separable modular portion, in some embodiments, is removable from the center console to assist with installation of the passenger seat into a passenger vehicle.

In certain embodiments, a time period required for coupling the separable modular portion with the stationary portion is less than about one minute.

The separable modular portion structural member, in certain embodiments, comprises at least one attachment member, wherein the at least one attachment member couples the separable modular portion structural member with the stationary portion structural member.

In some embodiments, the separable modular portion further comprises at least one electrical component and the electrical wiring consolidation device connects the at least one electrical component to the disconnect panel.

According to certain embodiments of the present invention, a passenger seat comprises a seat element, wherein the seat element comprises: a stationary component comprising: a stationary component structural member positioned at a connecting end of the stationary component; and a disconnect panel; and a removable modular component comprising: a removable modular component structural member positioned at a connecting end of the removable modular component and coupleable to the stationary component structural member; and an electrical wiring consolidation device comprising: an electrical cable bundle; and an electrical connector coupleable to the disconnect panel, wherein the stationary component structural member, the disconnect panel, the removable modular component structural member, and the electrical wiring consolidation device form a quick connect structure for coupling the removable modular component with the stationary component.

In certain embodiments, the seat element further comprises at least a portion of a center console, a seat back, a seat bottom, a leg rest, an armrest, a headrest, or a partition divider.

The removable modular component, in some embodiments, is interchangeable with at least one second removable modular component.

The at least one second removable modular component, in certain embodiments, comprises at least one different feature than the removable modular component.

The removable modular component may be removable from the seat element to assist with installation of the passenger seat into a passenger vehicle.

In some embodiments, a time period required for coupling the removable modular component with the stationary component is less than about one minute.

In certain embodiments, the removable modular component structural member comprises at least one attachment member, wherein the at least one attachment member couples the removable modular component structural member with stationary portion structural member.

The removable modular component may further comprise at least one electrical component and the electrical wiring consolidation device connects the at least one electrical component to the disconnect panel.

According to certain embodiments of the present invention, a method for coupling a removable modular component of a passenger seat with a stationary component of the passenger seat may comprise: attaching an electrical connector of the removable modular component to a disconnect panel of the stationary component; and attaching a removable modular component structural member of the removable modular component to a stationary component structural member of the stationary component, wherein the stationary component structural member, the disconnect panel, the removable modular component structural member, and the electrical connector form a quick connect structure for coupling the removable modular component with the stationary component.

In some embodiments, a time period required for coupling the removable modular component with the stationary component is less than about one minute.

In certain embodiments, attaching the removable modular component structural member of the removable modular component to the stationary component structural member of the stationary component comprises attaching at least one attachment member to at least one of the removable modular component structural member or the stationary component structural member.

In some embodiments, attaching the removable modular component structural member of the removable modular component to the stationary component structural member of the stationary component comprises inserting at least a portion of the removable modular component structural member into an opening defined by the stationary component structural member.

The removable modular component may further comprise at least one electrical component and attaching the electrical connector to the disconnect panel connects the at least one electrical component to the disconnect panel.

DETAILED DESCRIPTION

Figure 1:
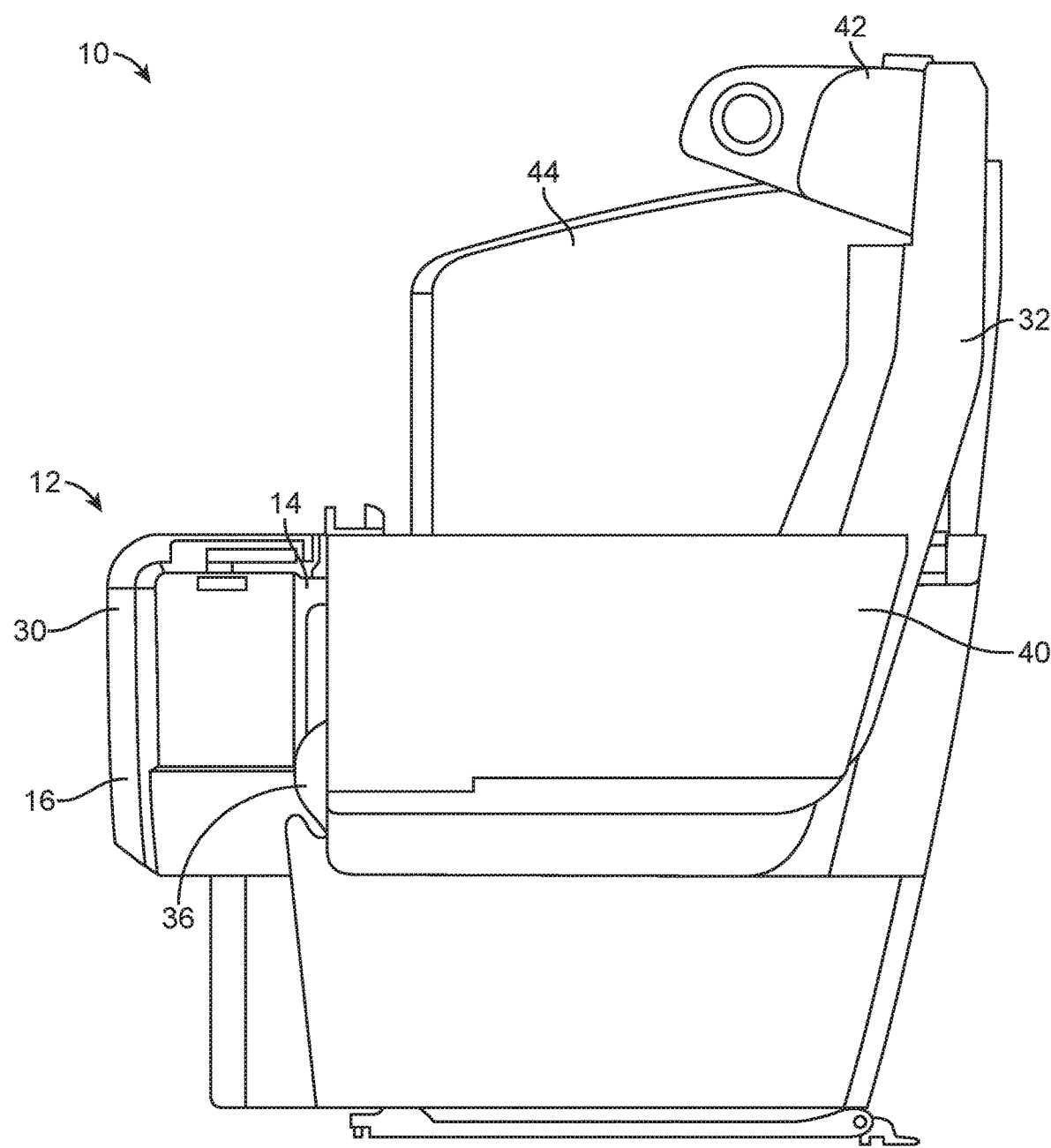
FIG. 1 is a left side view of a passenger seat with a removable modular center console, according to certain embodiments of the present invention.
Figure 2:
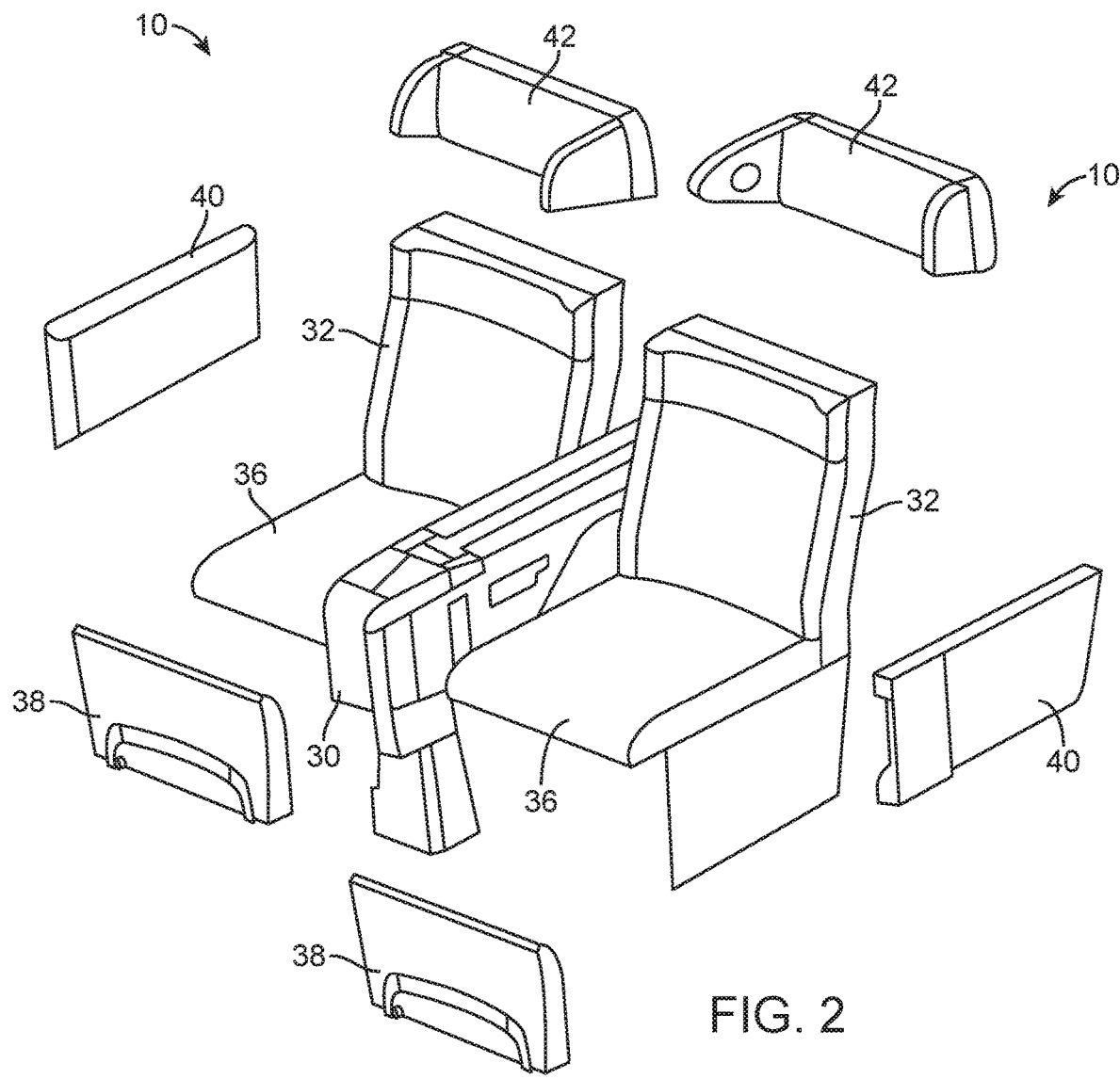
FIG. 2 is a front perspective view of the passenger seat of FIG. 1 with multiple removable modular components separated from the passenger seat.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a removable modular component for passenger seats. While the removable modular components are discussed for use with aircraft seats, they are by no means so limited. Rather, embodiments of the removable modular component may be used in passenger seats or other seats of any type or otherwise as desired.

Incorporating modular design components, such as the removable modular components, into passenger seats enables quick attachment and/or removal of the removable modular components to the passenger seats. This may permit the passenger seats to be installed and used in a wide variety of aircrafts because the removable modular components may remain separated from the passenger seats during installation of the passenger seat so the passenger seat meets the spatial requirements during installation, e.g., fitting through an aircraft door, and then may be attached to the passenger seats once the seats are positioned inside the aircraft in an efficient manner. The removable modular components may be designed for quick and straightforward attachment to and removal from the passenger seat or aircraft in a way that reduces the risk of any damage to the removable modular components, the passenger seats, or the aircraft during installation or removal. The removable modular components also allow for more customization of the passenger seats.

According to certain embodiments of the present invention, as shown in FIGS. 1-5B, a passenger seat 10 comprises at least one seat element 12. The seat element 12 may include at least one stationary component 14 and at least one removable modular component 16, where the removable modular component 16 is separable from the stationary component 14. In some embodiments, the seat element 12 may be at least a portion of a center console 30, a seat back 32, a seat bottom 36, a leg rest 38, an armrest 40, a headrest 42, or a partition divider 44.

The seat element 12, and any features of the seat element 12, may be formed of materials including but not limited to aluminum, stainless steel, aramid fibers, polycarbonate, polypropylene, other metallic materials, composite materials, or other similar materials. Additionally, the seat element 12 may include or be at least partially covered by a cushioning material, such as foam, feathers, cotton, etc.

In some embodiments, the seat element 12, e.g., the center console 30, may be designed so that any split lines that are created between the removable modular component 16 and the stationary component 14 follow pre-existing lines present in the single-piece center console. Using pre-existing lines when creating the split lines results in smooth seams and minimal disruption to the aesthetics of the seat element 12.

As best shown in FIGS. 3A-5B, the seat element 12 may be the center console 30. In some embodiments, the stationary component 14, which may also be referred to as a stationary portion, is an aft portion of the center console 30 and includes a stationary component structural member 18 and a disconnect panel 20. As is best shown in FIG. 3D, the stationary component structural member 18 may be positioned at an end, e.g., a connecting end, of the stationary component 14 located proximate to the removable modular component 16 when the removable modular component 16 is attached to the stationary component 14. The stationary component structural member 18 may extend, at least partially, across an opening of the stationary component 14.

The stationary component structural member 18 may provide the stationary component 14 with structural support. Additionally, the stationary component structural member 18 may assist with the coupling of the removable modular component 16 to the stationary component 14 by providing additional attachment locations.

The stationary component structural member 18 may be integrally formed with the stationary component 14 or may be separately formed and coupled with the stationary component 14 using any suitable form of chemical or mechanical attachment including, but not limited to, nuts and bolts, screws, pins and rivets, a snap-fit connection, a friction fit connection, adhesive, welding, other mechanical fasteners, and/or other chemical fasteners.

Additionally, the stationary component structural member 18 may take any suitable shape. For example, the stationary component structural member 18 may be rectangular, triangular, trapezoidal, circular, etc. In some embodiments, the stationary component structural member 18 may be shaped similarly to the shape of the opening of the stationary component 14. The stationary component structural member 18 may have any suitable number of openings and may also include at least one attachment member, e.g., a pin, a nut, a screw, etc., extending from the stationary component structural member 18. The openings may reduce the weight of the stationary component structural member 18. The attachment member and/or the openings in the stationary component structural member 18 may assist with coupling the removable modular component 16 to the stationary component 14.

In some embodiments, the disconnect panel 20 may include a single plug 28, though one of skill in the art would understand that any number of plugs 28 may be included. The plug 28 may be a universal serial bus ("USB") port or any other suitable port.

Figure 3A:
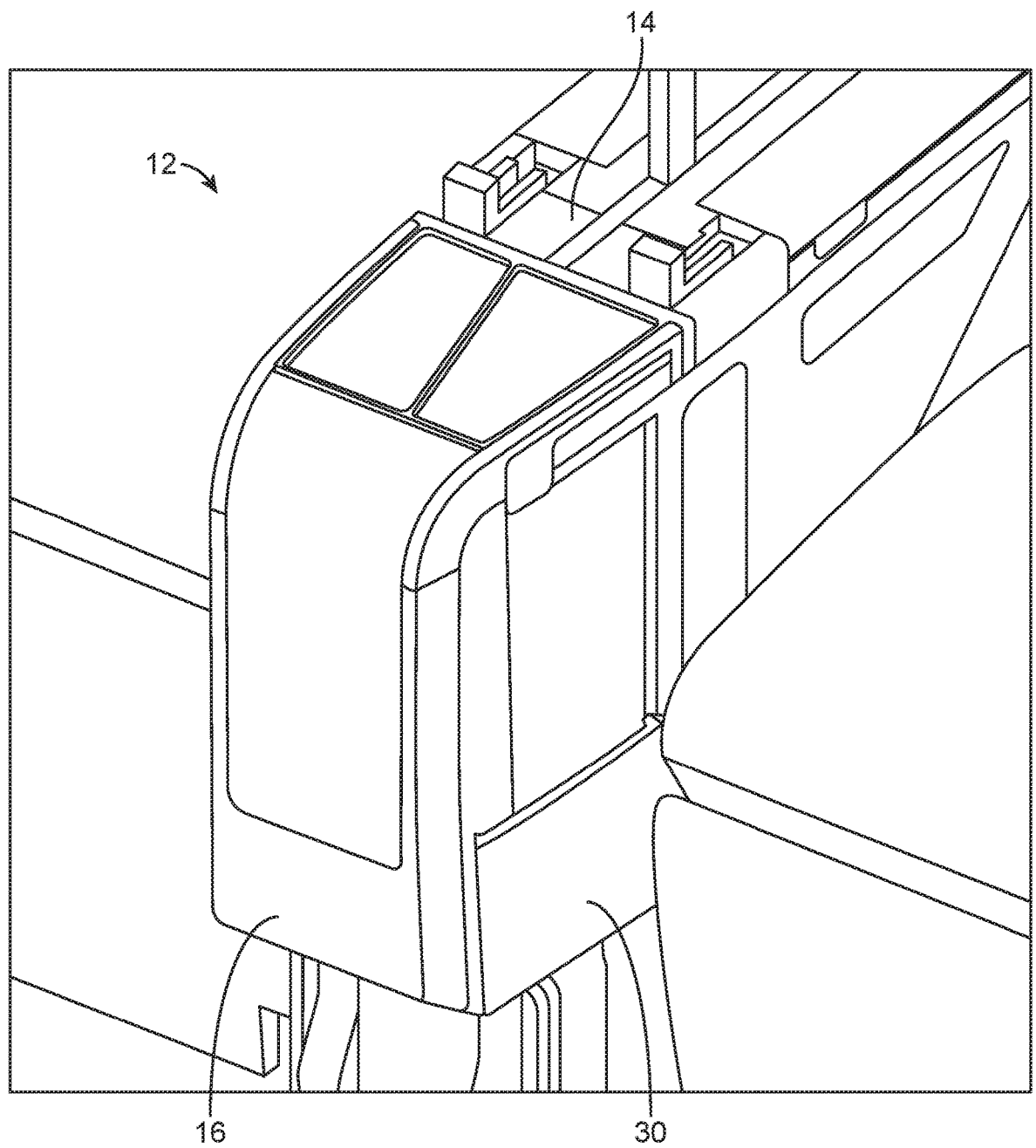
FIG. 3A is a front perspective view of the removable modular center console of FIG. 1.
Figure 3B:
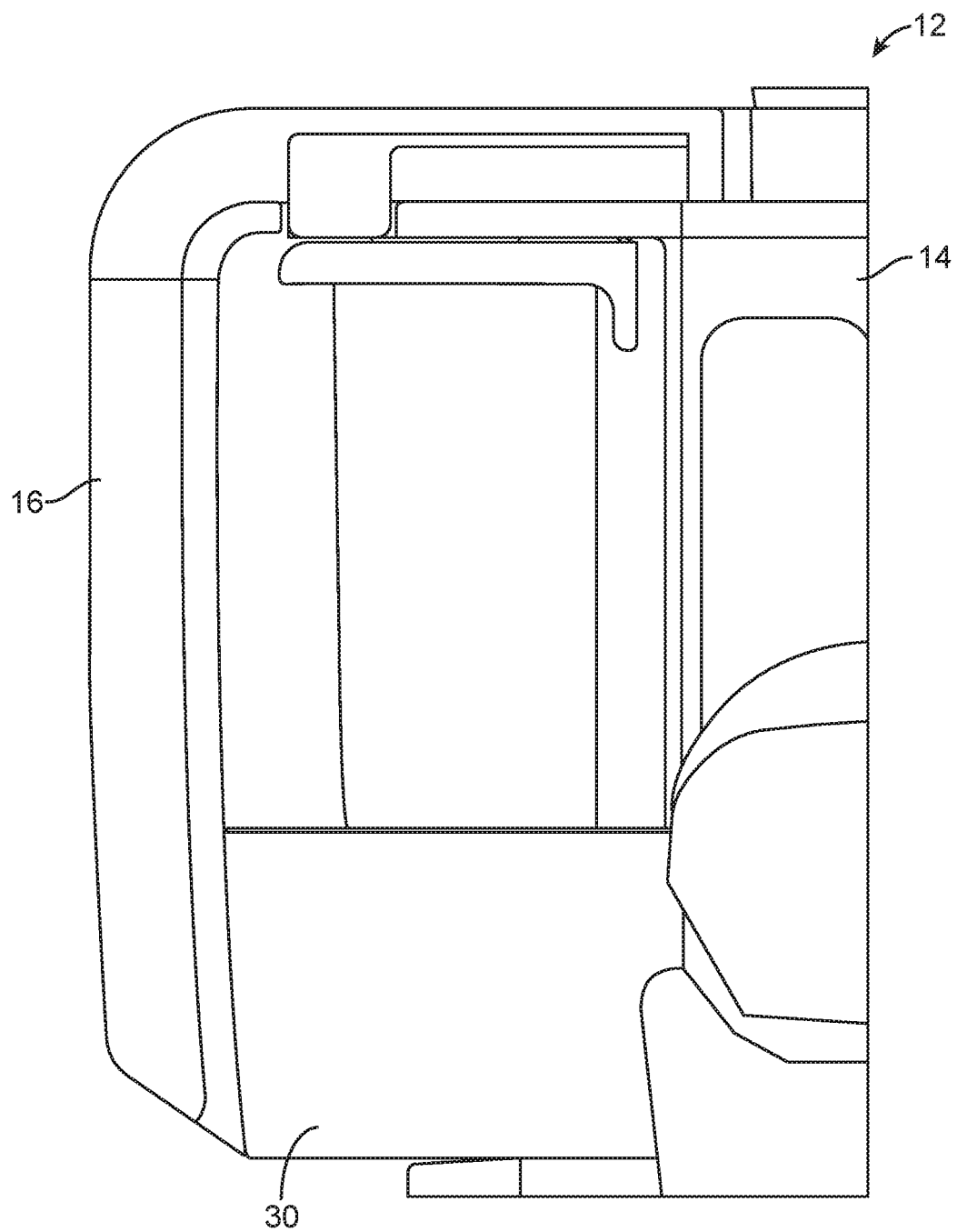
FIG. 3B is a left side view of the removable modular center console of FIG. 1.
Figure 3C:
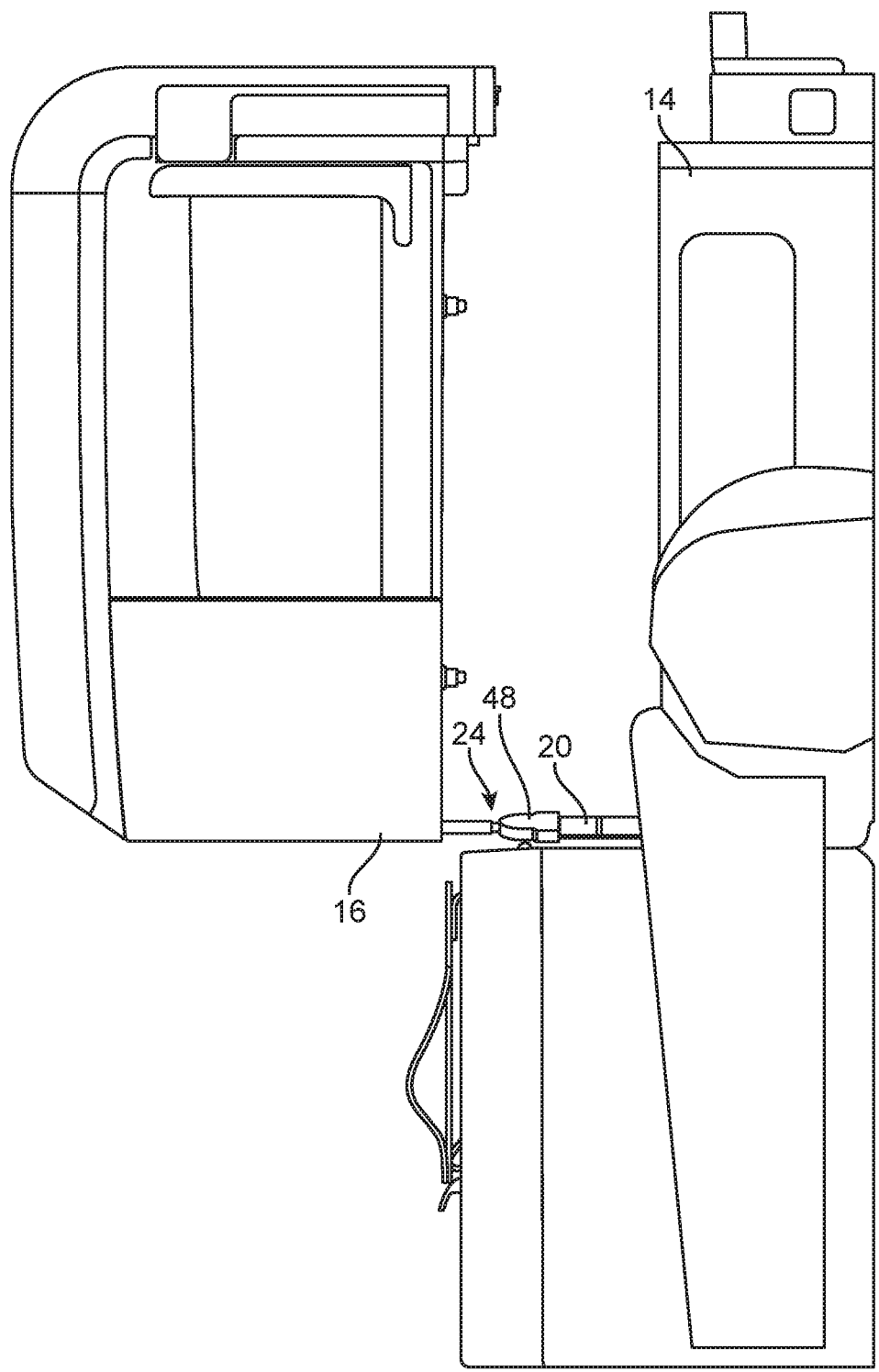
FIG. 3C is a left side view of the removable modular center console of FIG. 1 with a removable portion of the removable modular center console separated from a stationary portion of the removable modular center console.
Figure 3D:
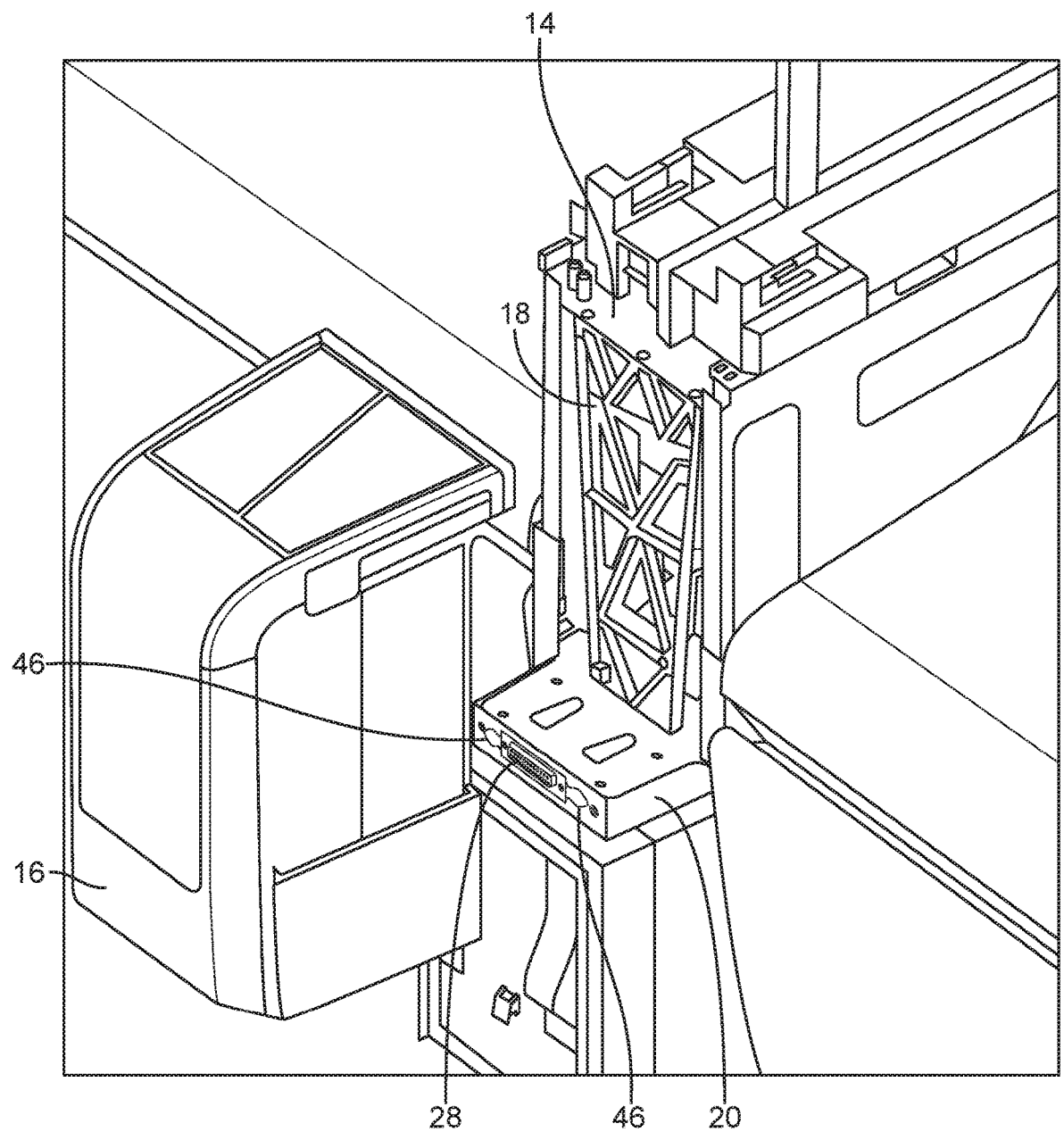
FIG. 3D is a front perspective view of the removable modular center console of FIG. 3C with an electrical wiring consolidation device separated from a disconnect panel.

The disconnect panel 20 may be positioned at any suitable location. For example, the disconnect panel 20 may be positioned at least partially below the stationary component structural member 18 with the plug 28 being located on a forward facing surface of the disconnect panel 20. The disconnect panel 20 may also include at least one securing device 46 positioned proximate to the plug 28. As best illustrated in FIG. 3D, the disconnect panel 20 may include two securing devices 46 coupled to two sides of the plug 28. The disconnect panel 20 provides a single connection point for connecting to power source(s) and/or computing system(s) that power and control various features of the passenger seat 10. Such features may include, but are not limited to, a headphone jack, a power outlet, a light source, seat adjustment controls, climate controls, etc.

In some embodiments, the removable modular component 16, which may also be referred to as a separable modular portion, is a forward portion of the center console 30 and includes a removable modular component structural member 22 and an electrical wiring consolidation device 24. The electrical wiring consolidation device 24 may include an electrical cable bundle 26 and an electrical connector 48.

Figure 3E:
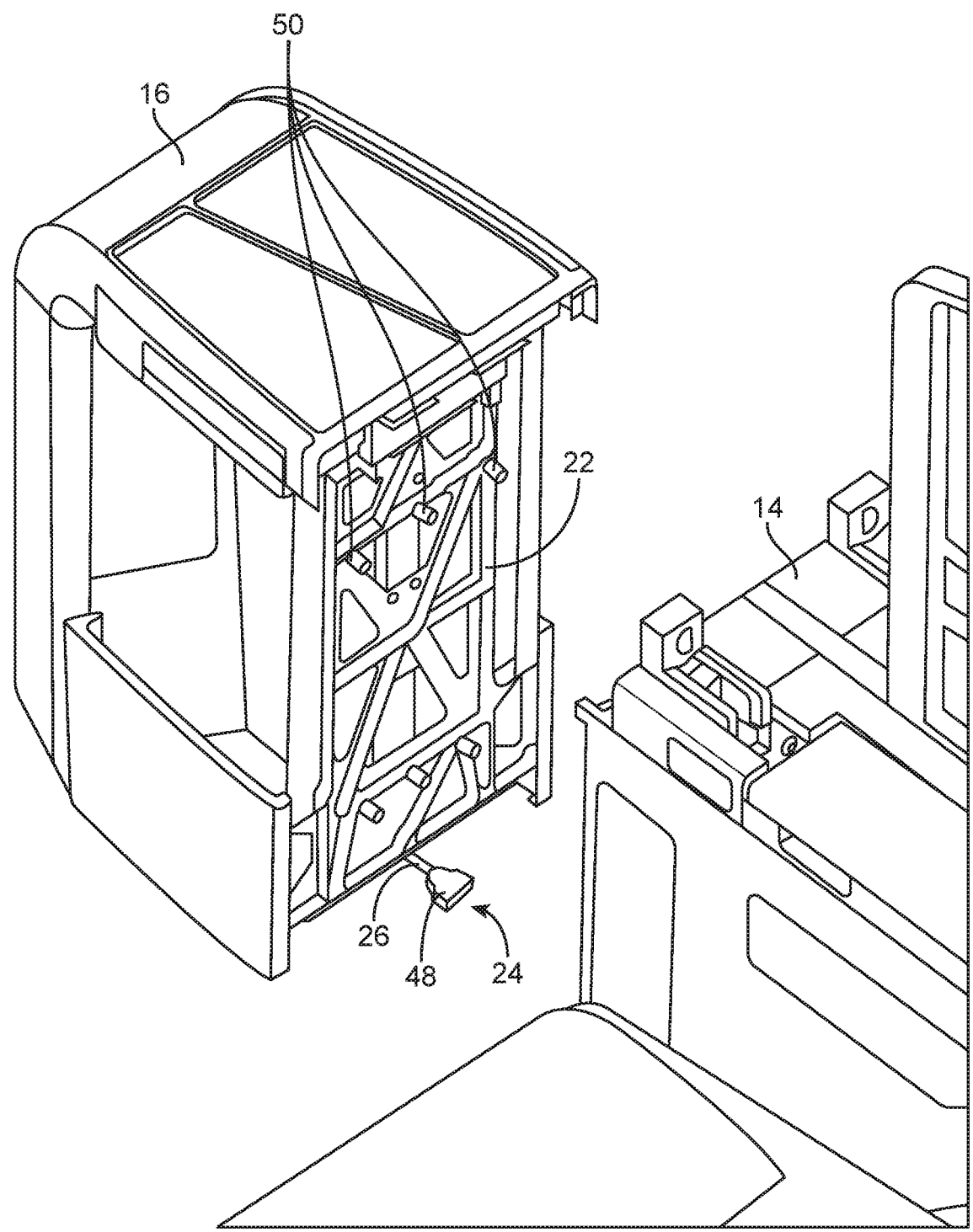
FIG. 3E is a rear perspective view of the removable modular center console of FIG. 3D.

The removable modular component structural member 22 may be the same as or similar to the stationary component structural member 18 described above. As is best shown in FIG. 3E, the removable modular component structural member 22 may be positioned at an end, e.g., a connecting end, of the removable modular component 16 located proximate to the stationary component 14 when the removable modular component 16 is attached to the stationary component 14. The removable modular component structural member 22 may extend, at least partially, across an opening of the removable modular component 16.

The removable modular component structural member 22 may provide the removable modular component 16 with structural support. Additionally, the removable modular component structural member 22 may assist with coupling the removable modular component 16 to the stationary component 14 by providing additional attachment locations.

The removable modular component structural member 22 may be integrally formed with the removable modular component 16 or may be separately formed and coupled with the removable modular component 16 using any suitable form of chemical or mechanical attachment including, but not limited to, nuts and bolts, screws, pins and rivets, a snap-fit connection, a friction fit connection, adhesive, welding, other mechanical fasteners, and/or other chemical fasteners.

Additionally, the removable modular component structural member 22 may be any suitable shape. For example, the removable modular component structural member 22 may be rectangular, triangular, trapezoidal, circular, etc. In some embodiments, the removable modular component structural member 22 may be shaped similarly to the shape of the opening of the removable modular component 16. The removable modular component structural member 22 may have any suitable number of openings and may also include at least one attachment member 50, e.g., a pin, a nut, a screw, etc., extending from the removable modular component structural member 22. These openings may reduce the weight of the removable modular component structural member 22. The attachment member 50 and/or the openings of the removable modular component structural member 22 may assist with the attachment of the removable modular component 16 to the stationary component 14.

In some embodiments, the removable modular component 16 may house electrical and/or computer components that must be connected to the power source(s) and/or computing system(s) of the passenger seat. The electrical cable bundle 26 of the electrical wiring consolidation device 24 is formed by grouping the wires of the electrical and/or computer components of the removable modular component 16. This grouping of wires may be encased or held together using any suitable material or method, e.g., fabric, electrical tape, zip ties, etc. In some embodiments, the electrical cable bundle 26 is coupled with the electrical connector 48. The electrical connector 48 may be a universal serial bus ("USB") or any other suitable connector.

Figure 4:
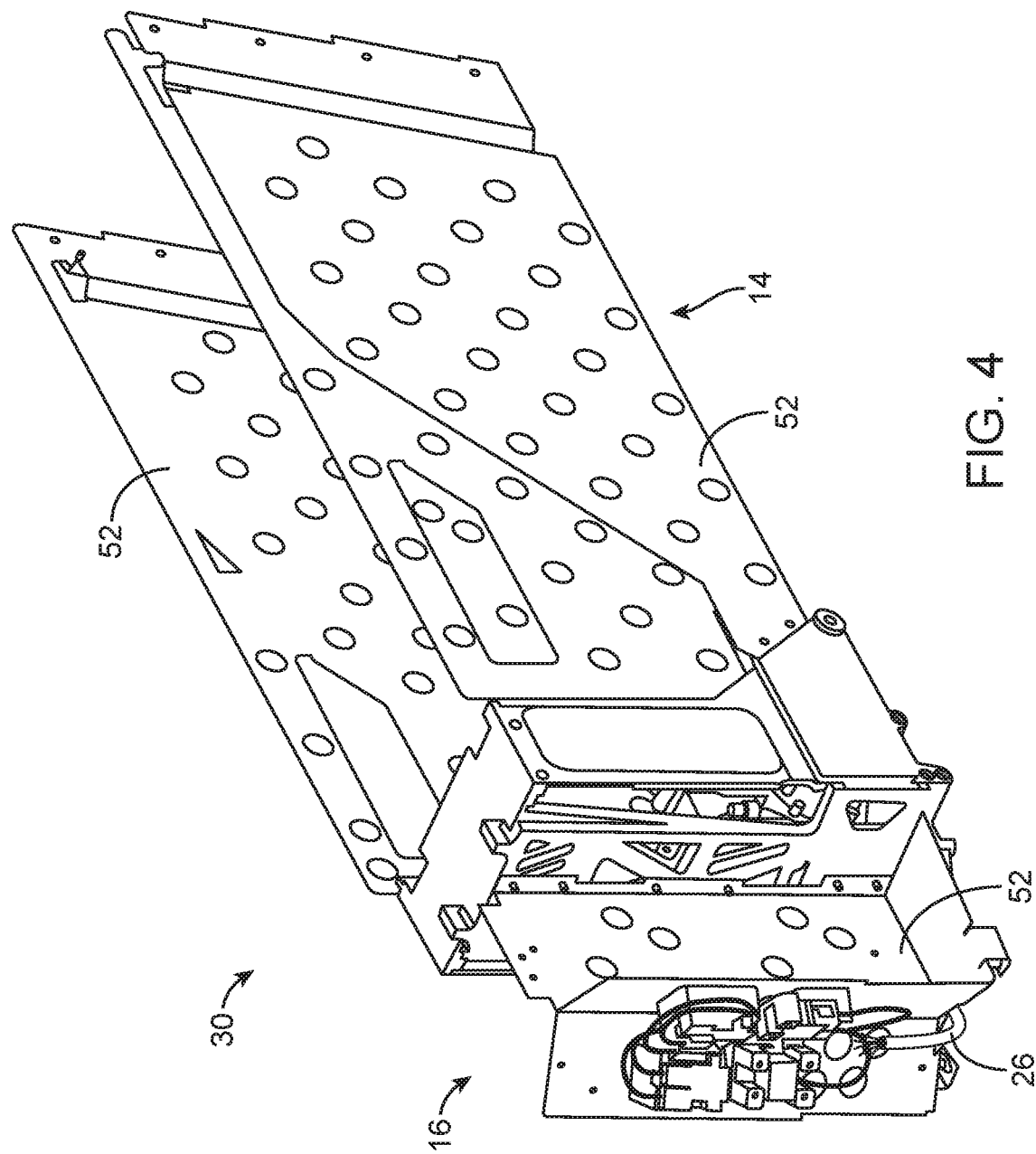
FIG. 4 is a front perspective view of internal structural and electrical components of a removable modular center console of a passenger seat, according to certain embodiments of the present invention.
Figure 5A:
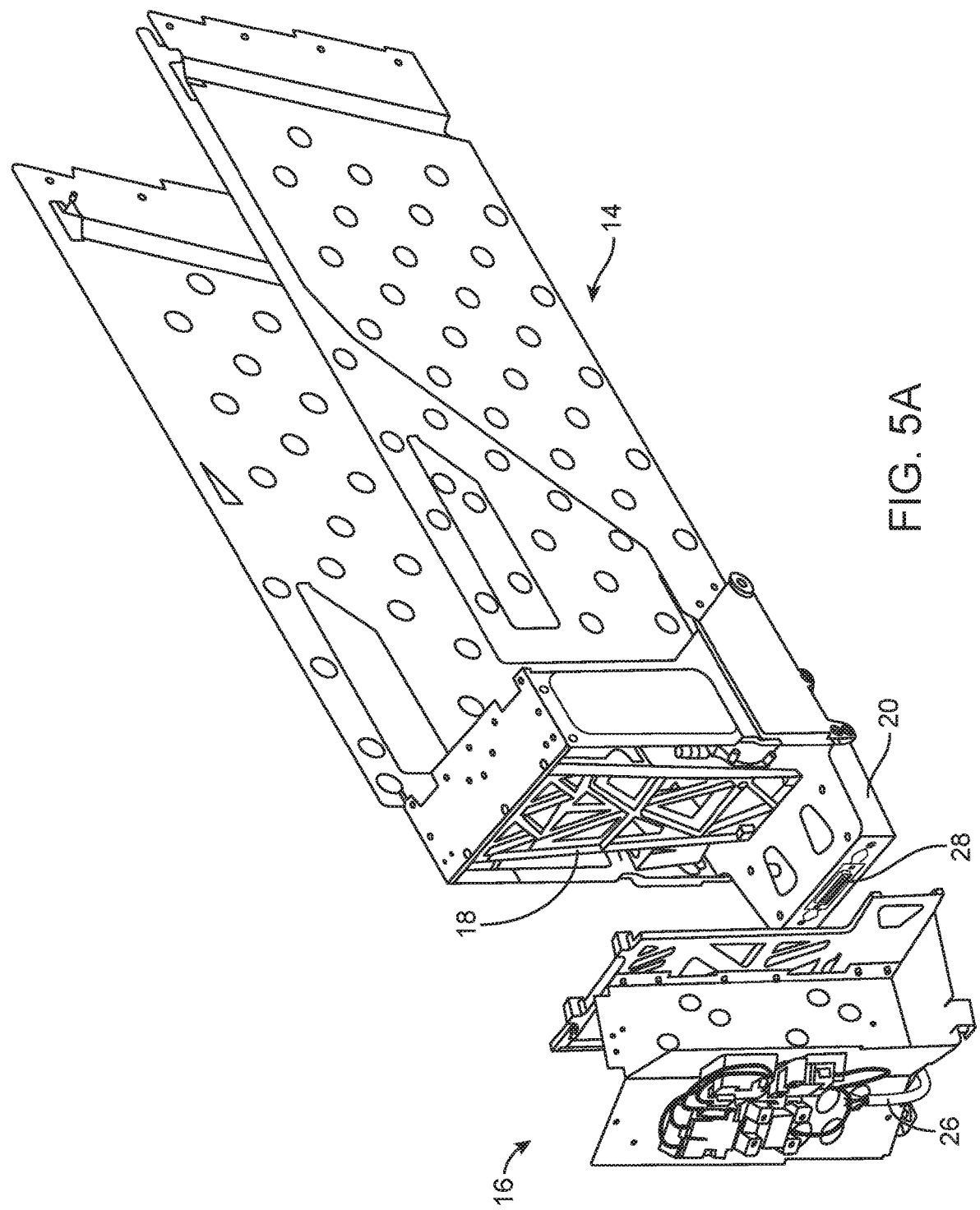
FIG. 5A is a front perspective view of the internal structural and electrical components of FIG. 4 with a removable portion of the internal structural and electrical components separated from a stationary portion of the internal structural and electrical components.
Figure 5B:
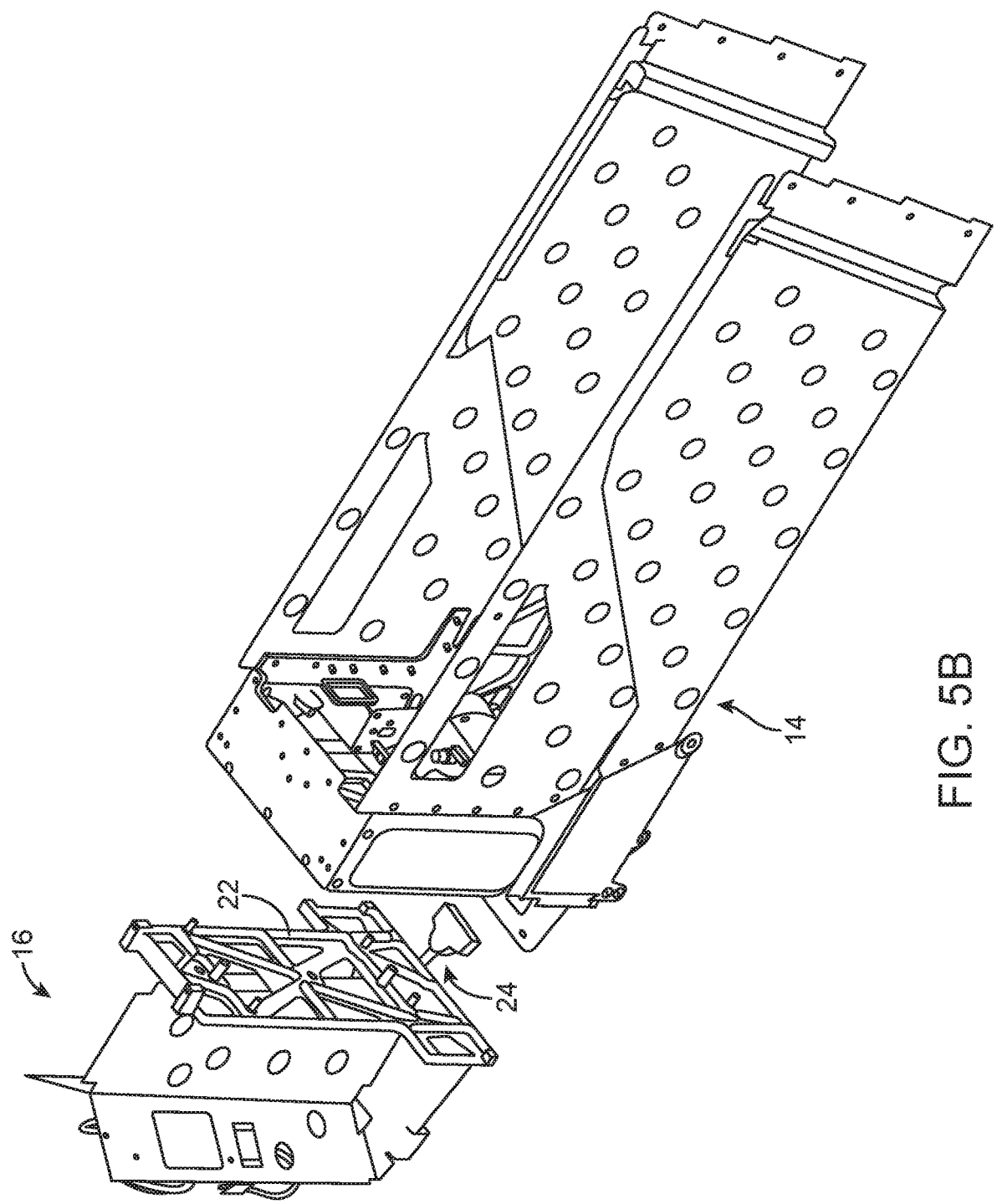
FIG. 5B is a rear perspective view of the internal structural and electrical components of FIG. 5A.

FIGS. 4 and 5A-5B show various interior elements of the center console 30. For example, internal support structures 52 may be positioned throughout the stationary component 14 and the removable modular component 16. These internal support structures 52 may include openings that reduce the overall weight of the center console 30.

Together, the stationary component structural member 18, the disconnect panel 20, the removable modular component structural member 22, and the electrical wiring consolidation device 24 may form a quick connect structure that enables the removable modular component 16 to be attached to and detached from the stationary component 14. The quick connect structure is designed to reduce the overall number of attachment points between the stationary component 14 and the removable modular component 16 to simplify the attachment and removal of the removable modular component. This allows for the attaching and detaching of the removable modular component 16 in a short amount of time and reduces the risk of damage to the stationary component 14 and the removable modular component 16 during the attachment and/or removal process.

To attach the removable modular component 16 to the stationary component 14, the electrical connector 48 may be coupled with the plug 28 of the disconnect panel 20. In some embodiments, the securing devices 46 may engage with the electrical connector 48 to secure the electrical connector 48 to the disconnect panel 20 and prevent any accidental disconnection of the electrical connector 48. By coupling the electrical connector 48 with the plug 28, all of the electrical and/or computer components housed in the removable modular component 16 may be connected through the electrical wiring consolidation device 24 and the disconnect panel 20 to the power source(s) and/or computing system(s) needed for the various features of the passenger seat 10.

The removable modular component structural member 22 may then be coupled with the stationary component structural member 18 to attach the removable modular component 16 to the stationary component 14. For example, the attachment members 50 extending from the may be inserted into corresponding openings in the stationary component structural member 18. The attachment members 50 may be threaded so that a bolt or similar device may be used to secure the removable modular component 16 to the stationary component 14. In some embodiments, the stationary component structural member 18 may have attachment members that are inserted into corresponding openings in the removable modular component structural member 22.

In some embodiments, the openings of either the removable modular component structural member 22 and/or the stationary component structural member 18 may be keyhole slot style openings that may accommodate those removable modular component 16 that are not able to slide straight into place when the removable modular component 16 is attached to the stationary component 14.

The removable modular component structural member 22 may be decoupled from the stationary component structural member 18 to separate the removable modular component 16 from the stationary component 14. For example, the attachment members 50 may be removed from the corresponding openings in the stationary component structural member 18 by moving the removable modular component 16 away from the stationary component 14. Removing the attachment members 50 from the corresponding openings may also require removing any bolts or similar devices that are attached to the attachment members 50. The electrical connector 48 may be disconnected from the plug 28 to fully separate the removable modular component 16 from the stationary component 14.

In some embodiments, a removable modular component 16 that is fully separated from the stationary component 14 is completely attached and secured to the stationary component 14 in a time period of less than about five minutes, about four minutes, about three minutes, about two minutes, about one minute, about 45 seconds, or about 30 seconds. Additionally, a removable modular component 16 that is completely attached and secured to the stationary component 14 may be fully separated from the stationary component 14 in a time period of less than about five minutes, about four minutes, about three minutes, about two minutes, about one minute, about 45 seconds, or about 30 seconds.

Using seat elements 12 with removable modular components 16 may allow for increased customization and use of the passenger seat 10. In some embodiments, the removable modular components 16 may assist with the installation process of the passenger seats 10 because larger passenger seats 10 may be incorporated into smaller aircrafts due to the removable modular components 16. The removable modular components 16 may be separate from the stationary components 14 while installing the passenger seat 10 into the airplane, which may permit the passenger seat 10 to fit through smaller aircraft doors and satisfy other dimensional constraints. The removable modular components 16 may be attached to the stationary components 14 inside the aircraft efficiently and with a reduced risk of damage to the elements of the passenger seats 10.

Additionally, the removable modular components 16 may be interchangeable with other removable modular components 16 that have different amenities or features so that the passenger seat 10 may be more easily customized to meet specific needs. For example, a removable modular component 16 of a center console 30 that has a cup holder, a headphone jack, and seat adjustment controls may be removed from a stationary component 14 of the center console 30, and a second removable modular component 16 of the center console 30 that has a foldable tray table and power outlet may be attached to the stationary portion of the center console.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. A passenger seat (which may incorporate features of any of the subsequent examples) comprising a center console, the center console comprising: a stationary portion comprising: a stationary portion structural member positioned at a connecting end of the stationary portion; and a disconnect panel; and a separable modular portion comprising: a separable modular portion structural member positioned at a connecting end of the separable modular portion and coupleable to the stationary portion structural member; and an electrical wiring consolidation device comprising: an electrical cable bundle; and an electrical connector coupleable to the disconnect panel, wherein the stationary portion structural member, the disconnect panel, the separable modular portion structural member, and the electrical wiring consolidation device form a quick connect structure for coupling the separable modular portion with the stationary portion.

Example 2. The passenger seat of Example 1 or any of the preceding or subsequent examples, wherein the separable modular portion is interchangeable with at least one second separable modular portion.

Example 3. The passenger seat of Example 2 or any of the preceding or subsequent examples, wherein the at least one second separable modular portion comprises at least one different feature than the separable modular portion.

Example 4. The passenger seat of Example 1 or any of the preceding or subsequent examples, wherein the separable modular portion is removable from the center console to assist with installation of the passenger seat into a passenger vehicle.

Example 5. The passenger seat of Example 1 or any of the preceding or subsequent examples, wherein a time period required for coupling the separable modular portion with the stationary portion is less than about one minute.

Example 6. The passenger seat of Example 1 or any of the preceding or subsequent examples, wherein the separable modular portion structural member comprises at least one attachment member, wherein the at least one attachment member couples the separable modular portion structural member with the stationary portion structural member.

Example 7. The passenger seat of Example 1 or any of the preceding or subsequent examples, wherein the separable modular portion further comprises at least one electrical component and the electrical wiring consolidation device connects the at least one electrical component to the disconnect panel.

Example 8. A passenger seat (which may incorporate features of any of the preceding or subsequent examples) comprising a seat element, wherein the seat element comprises: a stationary component comprising: a stationary component structural member positioned at a connecting end of the stationary component; and a disconnect panel; and a removable modular component comprising: a removable modular component structural member positioned at a connecting end of the removable modular component and coupleable to the stationary component structural member; and an electrical wiring consolidation device comprising: an electrical cable bundle; and an electrical connector coupleable to the disconnect panel, wherein the stationary component structural member, the disconnect panel, the removable modular component structural member, and the electrical wiring consolidation device form a quick connect structure for coupling the removable modular component with the stationary component.

Example 9. The passenger seat of Example 8 or any of the preceding or subsequent examples, wherein the seat element further comprises at least a portion of a center console, a seat back, a seat bottom, a leg rest, an armrest, a headrest, or a partition divider.

Example 10. The passenger seat of Example 8 or any of the preceding or subsequent examples, wherein the removable modular component is interchangeable with at least one second removable modular component.

Example 11. The passenger seat of Example 10 or any of the preceding or subsequent examples, wherein the at least one second removable modular component comprises at least one different feature than the removable modular component.

Example 12. The passenger seat of Example 8 or any of the preceding or subsequent examples, wherein the removable modular component is removable from the seat element to assist with installation of the passenger seat into a passenger vehicle.

Example 13. The passenger seat of Example 8 or any of the preceding or subsequent examples, wherein a time period required for coupling the removable modular component with the stationary component is less than about one minute.

Example 14. The passenger seat of Example 8 or any of the preceding or subsequent examples, wherein the removable modular component structural member comprises at least one attachment member, wherein the at least one attachment member couples the removable modular component structural member with stationary portion structural member.

Example 15. The passenger seat of Example 8 or any of the preceding or subsequent examples, wherein the removable modular component further comprises at least one electrical component and the electrical wiring consolidation device connects the at least one electrical component to the disconnect panel.

Example 16. A method (which may incorporate features of any of the preceding or subsequent examples) for coupling a removable modular component of a passenger seat with a stationary component of the passenger seat, the method comprising: attaching an electrical connector of the removable modular component to a disconnect panel of the stationary component; and attaching a removable modular component structural member of the removable modular component to a stationary component structural member of the stationary component, wherein the stationary component structural member, the disconnect panel, the removable modular component structural member, and the electrical connector form a quick connect structure for coupling the removable modular component with the stationary component.

Example 17. The method of Example 16 or any of the preceding or subsequent examples, wherein a time period required for coupling the removable modular component with the stationary component is less than about one minute.

Example 18. The method of Example 16 or any of the preceding or subsequent examples, wherein attaching the removable modular component structural member of the removable modular component to the stationary component structural member of the stationary component comprises attaching at least one attachment member to at least one of the removable modular component structural member or the stationary component structural member.

Example 19. The method of Example 16 or any of the preceding or subsequent examples, attaching the removable modular component structural member of the removable modular component to the stationary component structural member of the stationary component comprises inserting at least a portion of the removable modular component structural member into an opening defined by the stationary component structural member.

Example 20. The method of Example 16 or any of the preceding or subsequent examples, wherein the removable modular component further comprises at least one electrical component and attaching the electrical connector to the disconnect panel connects the at least one electrical component to the disconnect panel.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A passenger seat comprising a center console, the center console comprising:
   a stationary portion comprising:
      a stationary portion structural member positioned at a connecting end of the stationary portion and extending at least partially across an opening of the stationary portion, the stationary portion structural member defining a plurality of openings and comprising at least one stationary portion attachment member extending from the stationary portion structural member; and
      a disconnect panel; and
   a separable modular portion comprising:
      a separable modular portion structural member positioned at a connecting end of the separable modular portion, extending at least partially across an opening of the separable modular portion, the separable modular portion structural member defining a plurality of openings, and the separable modular portion structural member being coupleable to the stationary portion structural member via the at least one stationary portion attachment member; and
an electrical wiring consolidation device comprising:
an electrical cable bundle; and
an electrical connector coupleable to the disconnect panel,
wherein the stationary portion structural member, the disconnect panel, the separable modular portion structural member, and the electrical wiring consolidation device form a quick connect structure for coupling the separable modular portion with the stationary portion.

2. The passenger seat of claim 1, wherein the separable modular portion is interchangeable with at least one second separable modular portion.

3. The passenger seat of claim 2, wherein the at least one second separable modular portion comprises at least one different feature than the separable modular portion.

4. The passenger seat of claim 1, wherein the separable modular portion is removable from the center console to assist with installation of the passenger seat into a passenger vehicle.

5. The passenger seat of claim 1, wherein a time period required for coupling the separable modular portion with the stationary portion is less than about one minute.

6. The passenger seat of claim 1, wherein the at least one stationary portion attachment member extends from a front surface of the stationary portion structural member, and the front surface of the stationary portion structural member faces a front surface of the separable modular portion structural member.

7. The passenger seat of claim 1, wherein the separable modular portion further comprises at least one electrical component and the electrical wiring consolidation device connects the at least one electrical component to the disconnect panel.

8. A passenger seat comprising a seat element, wherein the seat element comprises:
a stationary component comprising:
a stationary component structural member positioned at a connecting end of the stationary component and extending at least partially across an opening of the stationary component, the stationary component structural member defining a plurality of openings; and
a disconnect panel; and
a removable modular component comprising:
a removable modular component structural member positioned at a connecting end of the removable modular component, extending at least partially across an opening of the removable modular component, the removable modular component structural member defining a plurality of openings and comprising at least one removable modular component attachment member extending from the removable modular component structural member, and the removable modular component structural member being coupleable to the stationary component structural member via the at least one removable modular component attachment member; and
an electrical wiring consolidation device comprising:
an electrical cable bundle; and
an electrical connector coupleable to the disconnect panel,
wherein the stationary component structural member, the disconnect panel, the removable modular component structural member, and the electrical wiring consolidation device form a quick connect structure for coupling the removable modular component with the stationary component.

9. The passenger seat of claim 8, wherein the seat element further comprises at least a portion of a center console, a seat back, a seat bottom, a leg rest, an armrest, a headrest, or a partition divider.

10. The passenger seat of claim 8, wherein the removable modular component is interchangeable with at least one second removable modular component.

11. The passenger seat of claim 10, wherein the at least one second removable modular component comprises at least one different feature than the removable modular component.

12. The passenger seat of claim 8, wherein the removable modular component is removable from the seat element to assist with installation of the passenger seat into a passenger vehicle.

13. The passenger seat of claim 8, wherein a time period required for coupling the removable modular component with the stationary component is less than about one minute.

14. The passenger seat of claim 8, wherein the at least one removable modular component attachment member extends from a front surface of the removable modular component structural member, and the front surface of the removable modular component structural member faces a front surface of the stationary component structural member.

15. The passenger seat of claim 8, wherein the removable modular component further comprises at least one electrical component and the electrical wiring consolidation device connects the at least one electrical component to the disconnect panel.

16. A method for coupling a removable modular component of a passenger seat with a stationary component of the passenger seat, the method comprising:
attaching an electrical connector of the removable modular component to a disconnect panel of the stationary component; and
attaching a removable modular component structural member of the removable modular component to a stationary component structural member of the stationary component via at least one removable modular component attachment member extending from the removable modular component structural member,
wherein the stationary component structural member, the disconnect panel, the removable modular component structural member, and the electrical connector form a quick connect structure for coupling the removable modular component with the stationary component, and
wherein the removable modular component structural member extends at least partially across an opening of the removable modular component and the removable modular component structural member defines a plurality of openings, and the stationary component structural member extends at least partially across an opening of the stationary component and the stationary component structural member defines a plurality of openings.

17. The method of claim 16, wherein a time period required for coupling the removable modular component with the stationary component is less than about one minute.

18. The method of claim 16, wherein the at least one removable modular component attachment member extends from a front surface of the removable modular component structural member, and the front surface of the removable modular component structural member faces a front surface of the stationary component structural member.

19. The method of claim 16, attaching the removable modular component structural member of the removable modular component to the stationary component structural member of the stationary component comprises inserting at least a portion of the removable modular component structural member into an opening defined by the stationary component structural member.

20. The method of claim 16, wherein the removable modular component further comprises at least one electrical component and attaching the electrical connector to the disconnect panel connects the at least one electrical component to the disconnect panel.

\* \* \* \* \*